United States Patent [19]

Kapinos

[11] 3,747,342

[45] July 24, 1973

[54] CONTROL SYSTEM FOR FLEXIBLE SEAL MOVABLE NOZZLE

[75] Inventor: Lawrence E. Kapinos, Ridgecrest, Calif.

[73] Assignee: The United States of America as represented by the Secretary of the Navy, Washington, D.C.

[22] Filed: Nov. 18, 1970

[21] Appl. No.: 90,592

[52] U.S. Cl............ 60/232, 239/265.35, 239/265.35
[51] Int. Cl. ............................................. F02k 1/24
[58] Field of Search.......................... 60/228, 232; 239/265.35, 265.41, 265.23; 91/361, 363, 413; 318/580, 638, 663, 678; 60/228, 232; 239/265.35, 265.41, 265.23; 91/361, 363, 413; 318/580, 638, 663, 678

[56] References Cited
UNITED STATES PATENTS

| | | | |
|---|---|---|---|
| 3,142,153 | 7/1964 | Hensley | 60/232 X |
| 3,051,137 | 8/1962 | Kutzler | 91/363 R X |
| 3,464,318 | 9/1969 | Thayer | 91/359 R |
| 3,016,697 | 1/1962 | Sternberg | 60/228 |
| 3,559,534 | 2/1971 | Munro | 91/363 |
| 3,350,886 | 11/1967 | Feraud | 60/231 X |
| 3,446,437 | 5/1969 | McCullough | 239/265.35 |
| 2,923,127 | 2/1960 | Biehl | 239/265.41 |
| 3,131,537 | 5/1964 | Thielman | 60/232 |
| 3,237,890 | 3/1966 | Thielman | 60/232 X |
| 3,142,153 | 7/1964 | Hensley | 60/232 X |
| 3,051,137 | 8/1962 | Kutzler | 91/363 R X |
| 3,464,318 | 9/1969 | Thayer | 91/359 R |
| 3,016,697 | 1/1962 | Sternberg | 60/228 |
| 3,559,534 | 2/1971 | Munro | 91/363 |
| 3,350,886 | 11/1967 | Feraud | 60/231 X |
| 3,446,437 | 5/1969 | McCullough | 239/265.35 |
| 2,923,127 | 2/1960 | Biehl | 239/265.41 |
| 3,131,537 | 5/1964 | Thielman | 60/232 |
| 3,237,890 | 3/1966 | Thielman | 60/232 X |

Primary Examiner—Carlton R. Croyle
Assistant Examiner—Robert E. Garrett
Attorney—R. S. Sciascia, Roy Miller, R. S. Sciascia and Roy Miller

[57] ABSTRACT

A control system for a flexible seal movable nozzle in which movement of the nozzle is effected by pairs of hydraulic actuators, one pair in the pitch plane and one pair in the yaw plane. Each of the paired actuators are connected to identical linear variable differential transducers or potentiometers which measure actuator displacements to provide a signal as loop feedback.

6 Claims, 5 Drawing Figures

INVENTOR.
LAWRENCE E. KAPINOS

BY: ROY MILLER
ATTORNEY.

CONTROL SYSTEM FOR FLEXIBLE SEAL MOVABLE NOZZLE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The prior art shows various rocket guidance means which function by deflecting exhaust gases. Some of these guidance means operate by deflecting through jet interaction, some deflect with moving vanes, and others deflect by swiveling the nozzle.

The most commonly used swivel nozzle is of the flexible seal type, and is operated by hydraulic piston actuators. Two actuators are used, one in the pitch plane and one in the yaw plane.

Three main problems arise when only one actuator and one transducer in each independent plane of motion is used:

Problem One: The geometry of the nozzle system for a given plane is such that the relationship between actuator stroke (and thus feedback) and nozzle angle is nonlinear. This nonlinearity is seen in the equation:

$$x = [(AC)^2 + (AB)^2 - 2(AC)(AB)\cos\Theta]^{1/2} - b$$

where
- $x$ = actuator displacement
- $\Theta$ = angular deflection of nozzle
- $A$ is the imaginary pivot point of the nozzle
- $B$ is the point of actuator mounting to the rocket motor
- $C$ is the point of actuator mounting to the nozzle.

and
- $b = BC$ when $\Theta = 0$

Problem Two: Due to the flexibility of the seal, motor pressure causes the nozzle to shift aft. The nozzle will then deflect in the direction of the actuator as a function of motor pressure.

Problem Three: Actuator cross coupling exists requiring simultaneous commands to the single actuator in each plane to deflect the nozzle in pure yaw or pure pitch.

Cross coupling occurs, for example, if it were desired to deflect the nozzle only in the pitch plane. If the pitch plane actuator is extended without extending the yaw plane actuator, the nozzle will shift in the direction of the jaw plane actuator.

DESCRIPTION OF THE PREFERRED EMBODIMENTS

Figure 1:
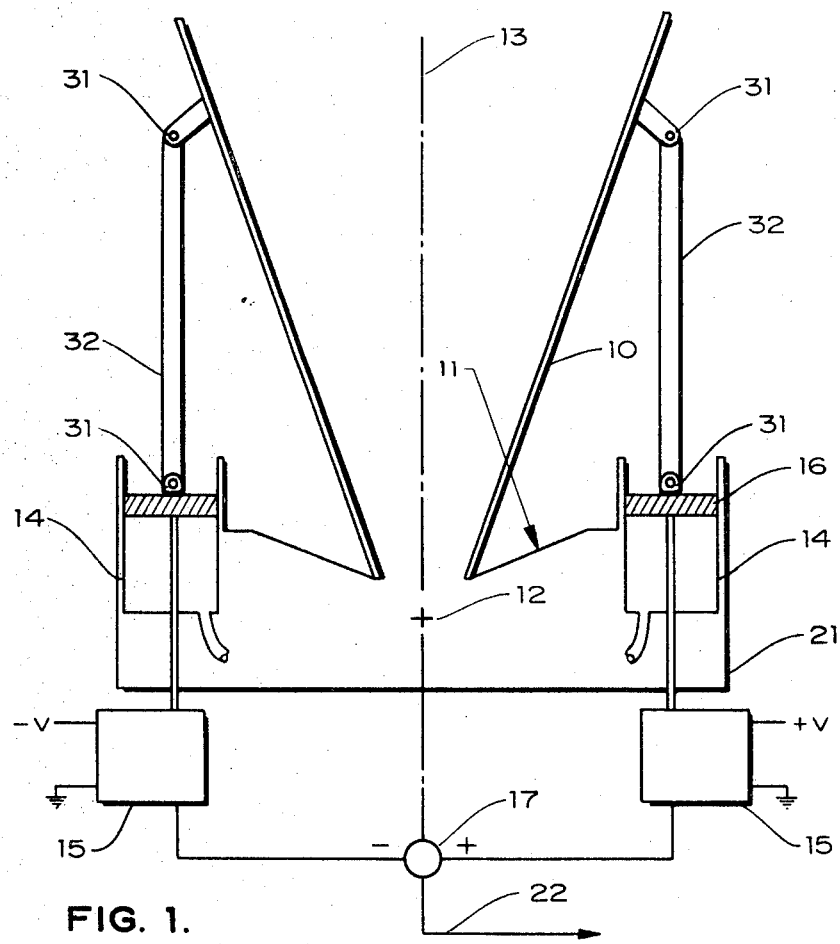
FIG. 1 shows a control system for a single plane of motion, comprising paired actuators.
Figure 2:
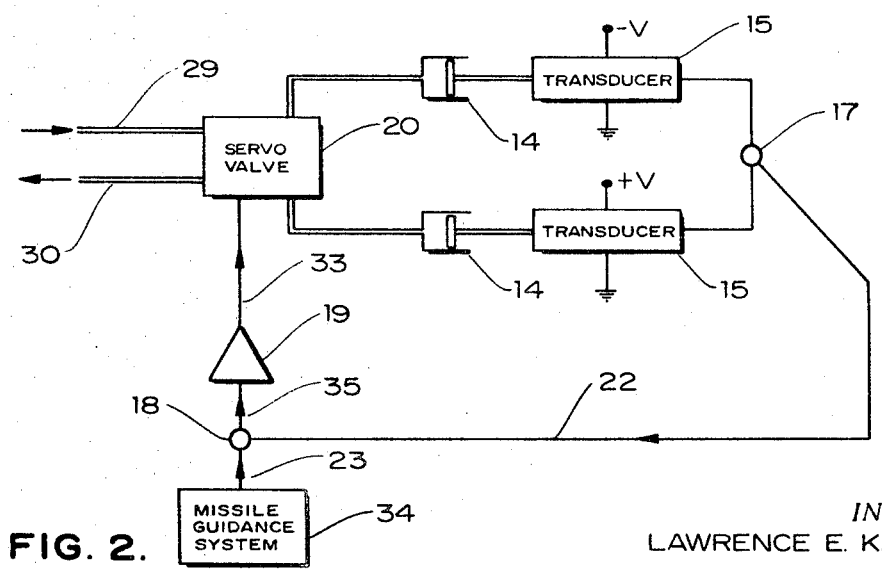
FIG. 2 is a diagrammatic view of the present invention.
Figure 3:
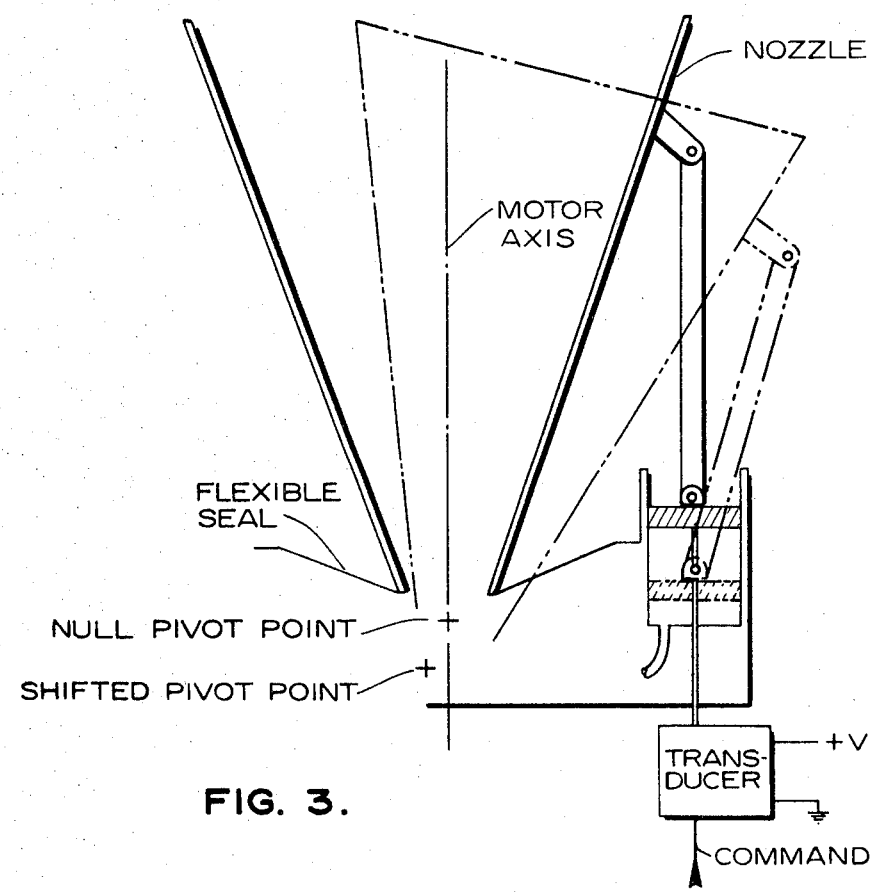
FIG. 3 shows a nozzle with a single actuator per independent plane of motion in a null and a shifted position.
Figure 4:
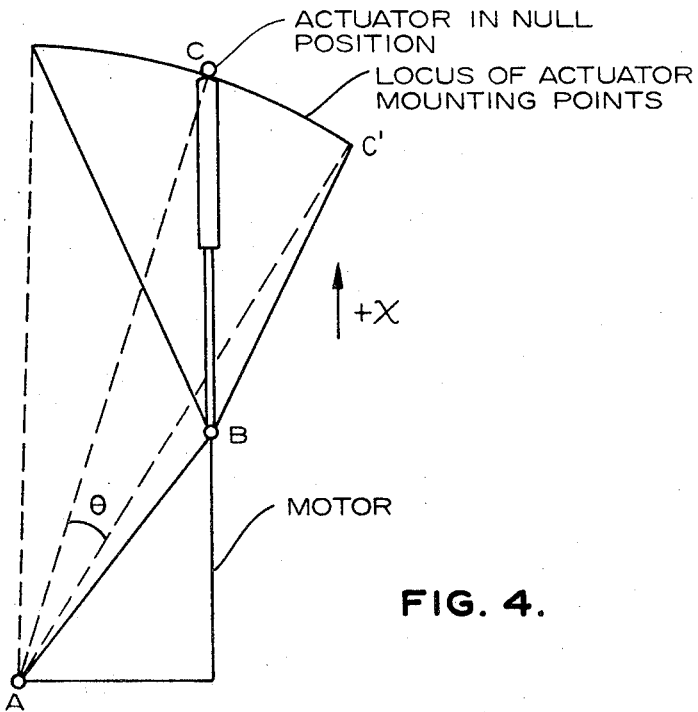
FIG. 4 shows the nonlinear geometric characteristics of a nozzle with a single actuator and single linear variable differential transducer per independent plane of motion.
Figure 5:
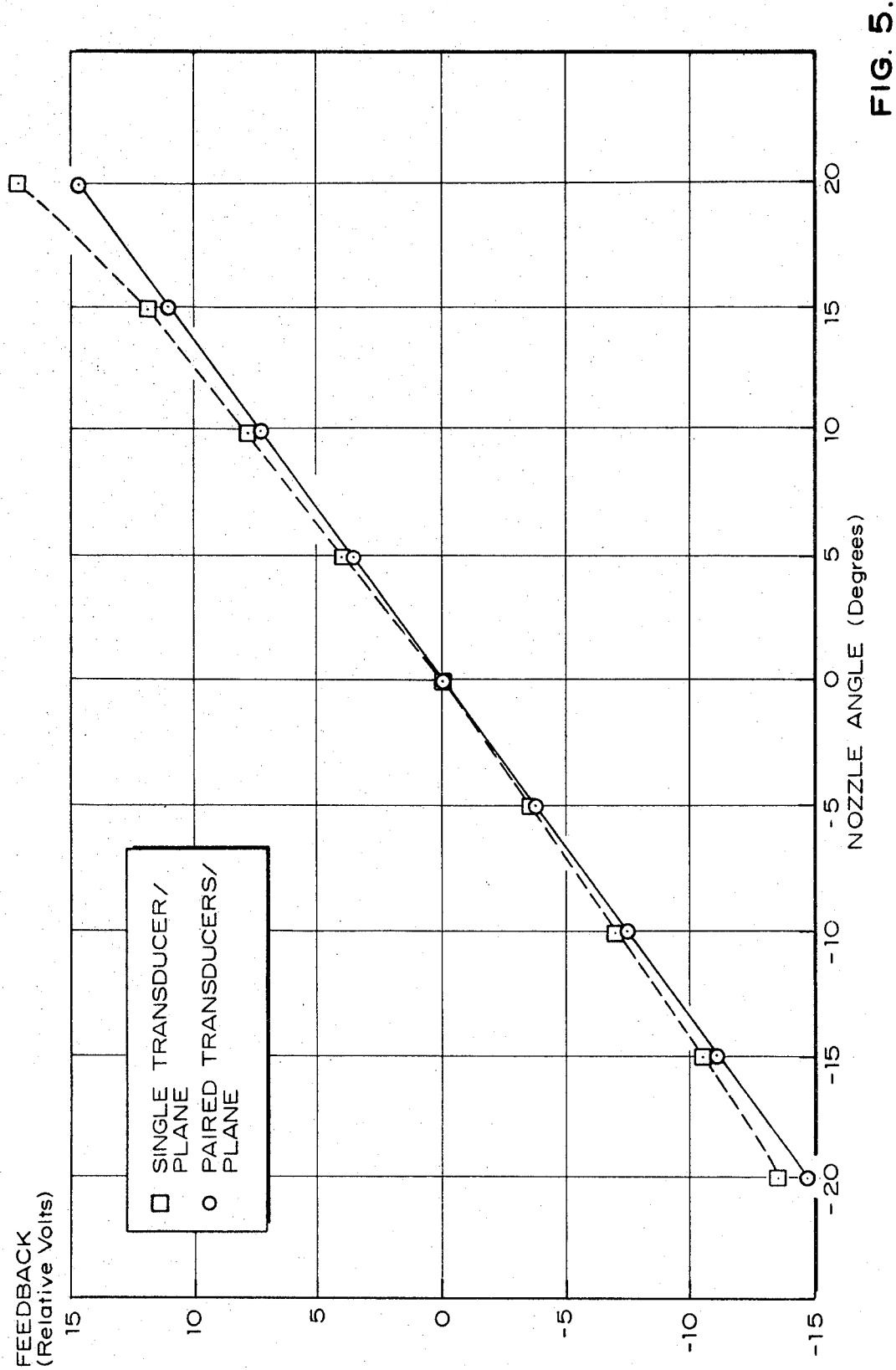
FIG. 5 is a graph of Feedback v. Nozzle Angle for both a single actuator system and a paired actuator system.

FIG. 1 shows a rocket motor 21 and nozzle 10 with a flexible seal 11 between the motor and nozzle. The nozzle pivots about imaginary pivot point 12. When the nozzle is in a null position, i.e., a position of zero angle deflection, it is centered about motor axis 13.

Hydraulic actuators 14 are used to deflect the nozzle. In each independent plane of motion, i.e., the pitch plane and the yaw plane a pair of these actuators 14 are located on opposite sides of the nozzle. Each actuator is attached to the nozzle and to the motor by hinges 31 and connecting rod 32.

Also connected to each actuator is a commercially available linear variable differential transducer 15. These transducers are mechanically connected to the actuators to measure actuator piston displacement. For each pair of actuators the associated transducers are identical. One of the paired transducers is excited with a positive voltage, the other with a negative voltage.

The paired transducers 15 are electrically connected to a summing point 17 to give an error signal 22 in volts. The error signal is summed at a summing point 18 with a command signal 23 received from the missile guidance system 34. The resulting signal 35 is amplified by amplifier 19 into a servo signal 33. The servo signal is fed to a servo valve 20.

The servo valve 20 is connected electrically to the amplifier and hydraulically to the paired actuators 14. The servo valve is supplied with a hydraulic fluid source by supply line 29 and exit line 30.

FIG. 1 shows that when the nozzle is at a null position, both actuator displacements must be equal. The transducer voltages will be equal and of opposite sign causing the error signal to be zero.

If the nozzle becomes deflected to the left in FIG. 1, the paired transducers produce a positive error signal 22. Assuming a zero command signal 23, the error signal is amplified to become the servo signal 33. The servo signal causes the servo valve, in a well known manner to automatically adjust the actuators until the error signal, and the servo signal becomes zero.

If a negative command signal is introduced into a null system, the nozzle will be deflected leftward. The negative command signal 23 is amplified to produce a negative servo signal 33. The negative servo signal causes the servo valve, in a well known manner, to automatically adjust the actuators until the error signal becomes positive and equal in absolute value to the negative command signal. These two signals are summed at a summing point 18 to give a zero servo signal. The nozzle consequently remains deflected to the left.

CONCLUSION

The present invention solves the three aforementioned problems of the prior art single actuator and single transducer per plane rocket guidance system.

The present invention solves the nonlinearity of problem one by using actuator differential displacement as the basis for feedback. This causes the relationship between feedback signal (thus command signal) and nozzle angle to be linear.

Problem two, nozzle deflection as a function of motor pressure, is solved by the present invention. Equal displacements of each actuator in a given plane are allowed via servo valve spool leakage. A true null angle is thus maintained during a rise in motor pressure.

The third problem, actuator cross coupling, does not occur with the present invention. The actuators in the inactive plane automatically extend, due to servo valve spool leakage, as the nozzle increases its deflection angle. Thereby a pure single plane motion is maintained.

What is claimed is:

1. A control system for a pivoting rocket motor nozzle comprising:

paired nozzle actuators for pivoting said nozzle, each actuator being mechanically connected to a rocket motor and to the nozzle of the rocket motor;

paired transducers, each transducer being connected to a respective actuator and producing a voltage proportional to the linear displacement of its respective actuator;

one of each of said paired transducers being excited with a positive voltage and the other of the paired transducers being excited with a negative voltage;

each pair of transducers being electrically connected to an error signal summing point;

said summing point producing an error signal for loop feedback;

said error signal being electrically summed at a servo summing point with a command signal to produce a servo signal;

a servo valve for hydraulically moving said actuator in response to said servo signal; and said servo summing point being electrically connected to said valve;

whereby the relationship between feedback signal and nozzle angle is linear.

2. he system of claim 1 wherein each pair of nozzle actuators is located in an independent plane of motion of the nozzle.

3. The system of claim 1 wherein paired actuators are located in each of the pitch and yaw planes.

4. The system of claim 1 in which said transducers are linear variable differential transducers.

5. The system of claim 1 wherein paired transducers are identical.

6. The system of claim 1 wherein each of said transducers produces an identical absolute value of voltage for a given displacement of said actuators.

* * * * *